(12) United States Patent
Jean

(10) Patent No.: US 9,096,120 B2
(45) Date of Patent: Aug. 4, 2015

(54) FUEL FILLING DEVICE FOR A SHIP AND A FUEL CAP THEREOF

(71) Applicant: Wen-Fong Jean, Taoyuan (TW)

(72) Inventor: Wen-Fong Jean, Taoyuan (TW)

(73) Assignee: Tibest International Inc., Taoyuan (TW)

( * ) Notice: Subject to any disclaimer, the term of this patent is extended or adjusted under 35 U.S.C. 154(b) by 299 days.

(21) Appl. No.: 13/723,282

(22) Filed: Dec. 21, 2012

(65) Prior Publication Data

US 2014/0174580 A1  Jun. 26, 2014

(51) Int. Cl.
*B60K 15/04* (2006.01)
*B60K 15/00* (2006.01)
*F16L 55/11* (2006.01)

(52) U.S. Cl.
CPC ............ *B60K 15/00* (2013.01); *B60K 15/0406* (2013.01); *F16L 55/1125* (2013.01); *B60K 2015/0438* (2013.01)

(58) Field of Classification Search
CPC ............... B60K 15/0406; B60K 2015/0438; F16L 55/1125
USPC ................... 138/89; 220/293, 298, 303, 304, 220/DIG. 33
See application file for complete search history.

(56) References Cited

U.S. PATENT DOCUMENTS

| | | | | |
|---|---|---|---|---|
| 5,680,954 A * | 10/1997 | Arnold et al. | ................. | 220/300 |
| 5,697,602 A * | 12/1997 | Guerra Cisneros et al. | .. | 220/328 |
| 6,568,553 B2 * | 5/2003 | Hagano et al. | ................. | 220/304 |
| 6,705,483 B2 * | 3/2004 | Hagano et al. | ................. | 220/303 |
| 7,278,547 B2 * | 10/2007 | Hagano et al. | ................. | 220/304 |
| 7,281,639 B2 * | 10/2007 | Yoshida et al. | ................ | 220/304 |
| 7,487,879 B2 * | 2/2009 | Yoshida et al. | ................ | 220/304 |
| 7,600,650 B2 * | 10/2009 | Hagano et al. | ................. | 220/302 |
| 8,240,491 B2 * | 8/2012 | Beecroft et al. | .............. | 215/216 |
| 2001/0035415 A1 * | 11/2001 | Hilger et al. | ................... | 220/301 |
| 2005/0121454 A1 * | 6/2005 | Yoshida et al. | ............... | 220/293 |

\* cited by examiner

*Primary Examiner* — Daniel R Shearer
(74) *Attorney, Agent, or Firm* — Alan D. Kamrath; Kamrath IP Lawfirm, P.A.

(57) ABSTRACT

A fuel filling device includes a fuel pipe seat having a filling port and a fuel pipe in communication with the filling port. Three engagement portions are formed on an inner peripheral face of the fuel pipe. A fuel cap includes a body and an operative portion mounted to the body. Three tracks are formed on an outer periphery of the body. Each track includes a front, lower end and a rear, higher end having a stop. An entrance is defined in front of the front, lower end of each track. The fuel cap is inserted into the fuel pipe with the engagement portions respectively received in the entrances of the tracks. The fuel cap is rotated in a locking direction. The tracks move relative to the engagement portions until the engagement portions are stopped by the stops of the tracks, and the fuel cap is in a locking position.

11 Claims, 10 Drawing Sheets

FUEL FILLING DEVICE FOR A SHIP AND A FUEL CAP THEREOF

BACKGROUND OF THE INVENTION

The present invention relates to a fuel filling device for a ship and a fuel cap of the fuel filling device and, more particularly, to a fuel filling device including a fuel cap having a mark for indicating the locking position of the fuel cap relative to a fuel pipe seat to which the fuel cap is mounted.

A ship or boat generally includes an engine power system and a fuel supply system for supplying fuel to the engine power system for driving the ship. The fuel supply system for a ship generally includes a fuel pipe seat fixed in a body or a deck of the ship. The fuel pipe seat includes a filling port in an outer end thereof. A fuel pipe is connected to an inner end of the fuel pipe seat for conveying fuel into a fuel tank connected to the engine power system. In fuel filling operation, a fuel cap at the filling port is removed, and a fuel gun of an external fuel filling machine is inserted into the filling port of the fuel pipe seat. Fuel is filled into the fuel tank through the fuel pipe seat and the fuel pipe. After filling, the fuel gun is removed, and the fuel cap reengages with and seals the filling port of the fuel pipe seat.

However, the mechanism between the fuel cap and the fuel pipe seat of the ship generally uses inner thread/outer thread coupling under cost consideration. Although a fixing effect can be obtained by the inner thread/outer thread coupling, the operator has to rotate the fuel cap many turns until the fuel cap reaches a locking position or a loosened position, which is inconvenient to operation. Furthermore, the operator can not know whether the fuel cap is in the locking position with the naked eye, because there is no indicating device on either of the fuel cap and the fuel pipe seat, causing operational trouble.

Thus, a need exists for a novel fuel filling device that mitigates and/or obviates the above disadvantages.

BRIEF SUMMARY OF THE INVENTION

The primary objective and function of the present invention is to avoid misalignment of a fuel cap for a ship in a locking position, wherein the fuel cap is engaged with a fuel pipe seat and rotated until the fuel cap reaches a locking position indicated by visible marks, providing reliable sealing, leakproofness, and a dustproof function while allowing easy and fast operation of locking and opening of the fuel cap.

Another objective of the present invention is to provide a fuel cap in which a sound is generated when the fuel cap reaches the locking position.

The above objectives are fulfilled by a fuel filling device for a ship and a fuel cap of the fuel filling device. The fuel filling device includes a fuel pipe seat having a fixed seat with a filling port. The fuel pipe seat further includes a fuel pipe extending downward from and in communication with the filling port. A first engagement portion, a second engagement portion, and a third engagement position are formed on an inner peripheral face of the fuel pipe and spaced from each other in a circumferential direction. The fuel cap includes a body extending along a longitudinal axis. The fuel cap further includes an operative portion mounted to the body. A first track, a second track, and a third track are formed on an outer periphery of the body and spaced from each other in a circumferential direction about the longitudinal axis. Each of the first, second, and third tracks includes a front, lower end and a rear, higher end having a stop. An entrance is defined in front of the front, lower end of each of the first, second, and third tracks.

The fuel cap is inserted into the fuel pipe of the fuel pipe seat with the first, second, and third engagement portions respectively received in the entrances of the first, second, and third tracks. The fuel cap is rotated relative to the fuel pipe seat in a locking direction. The first, second, and third tracks move relative to the first, second, and third engagement portions until the first, second, and third engagement portions are stopped by the stops of the first, second, and third tracks, and the fuel cap is in a locking position and blocks the fuel pipe.

Preferably, the fixed seat includes a first mark, and the body of the fuel cap includes a second mark. The second mark is aligned with the first mark when the fuel cap is in the locking position.

Preferably, a flange extends outward from a top side of the body, and a sealing ring is mounted between the flange and an outer periphery of the body.

Preferably, the body of the fuel cap further includes a bottom side spaced from the top side of the body along the longitudinal axis of the body. A pressure relief hole extends from the top side through the bottom side of the body of the fuel cap. A pressure relief valve is mounted in the pressure relief hole. An annular ridge is formed on the top side of the body and extends along a periphery of a top opening of the pressure relief hole. The operative portion is pivotably mounted by a pin to the top side of the body. The operative portion includes a hole. The operative portion is pivotable between a rest position and an upright position. The annular ridge is received in the hole of the operative portion when the operative portion is in the rest position. The operative portion in the upright position is adapted to be gripped by an operator to rotate the body for locking the fuel cap to the fuel pipe seat or removing the fuel cap from the fuel pipe seat.

Preferably, the first engagement portion of the fuel pipe seat has a length in the circumferential direction larger than a length of the second engagement portion in the circumferential direction and larger than a length of the third engagement portion in the circumferential direction. Lengths of the entrances of the first, second, and third tracks of the fuel cap in the circumferential direction are respectively equal to the lengths of the first, second, and third engagement portions.

Preferably, the body of the fuel cap includes an upper body part and a lower body part engaged with the upper body part. The upper and lower body parts together define the first, second, and third tracks.

Preferably, the stops of the first, second, and third tracks are formed on the upper body part, and the entrances of the first, second, and third tracks are formed on the lower body part.

Preferably, the upper body part includes a positioning portion and a stub extending downward from the positioning portion. The lower body part includes an axial positioning hole. The positioning portion of the upper body part is received in the axial positioning hole of the lower body part. A fixing member is fixed to a bottom end of the stub. A spring is mounted around the stub and biases the lower body part to press against the positioning portion of the upper body part.

Preferably, the bottom end of the stub has a screw hole, the fixing member has a fixing hole, and a bolt extends through the fixing hole of the fixing member into the screw hole of the stub to fix the fixing member.

Preferably, the lower body part is an elastomer. Each of the first, second, and third tracks includes a concave engagement section adjacent to the stop thereof. Bottoms of the first, second, and third engagement portions are respectively engaged with the concave engagement sections when the fuel cap is in the locking position. A sound is generated when the fuel cap reaches the locking position.

The present invention will become clearer in light of the following detailed description of illustrative embodiments of this invention described in connection with the drawings.

DETAILED DESCRIPTION OF THE INVENTION

Figure 1:
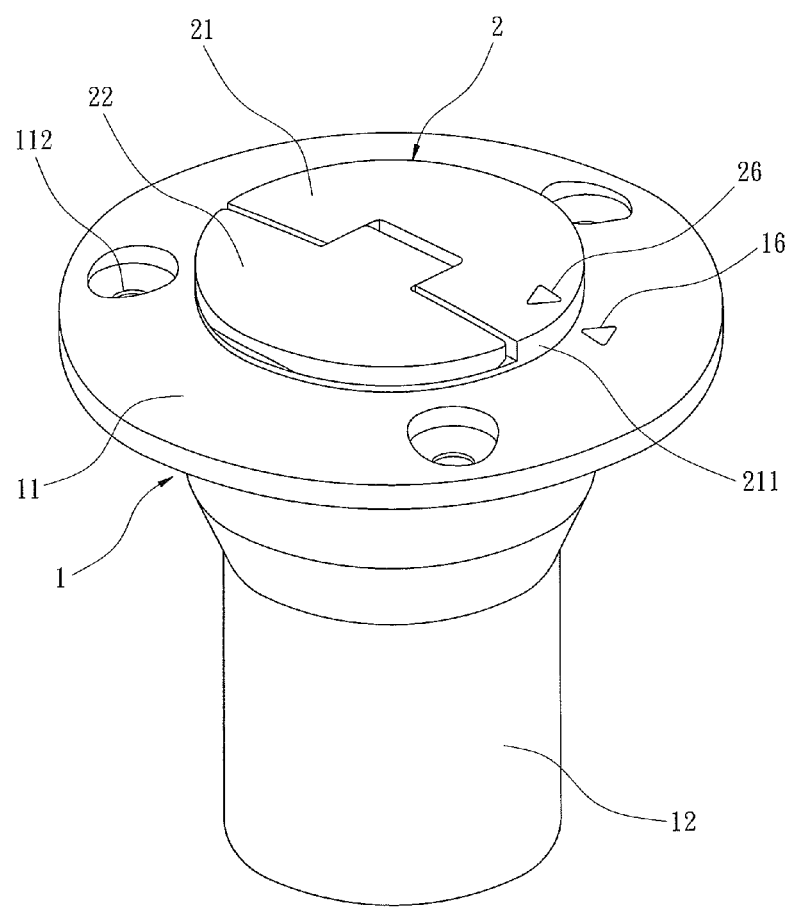
FIG. 1 shows a perspective view of a fuel filling device for a ship according to the present invention.
Figure 2:
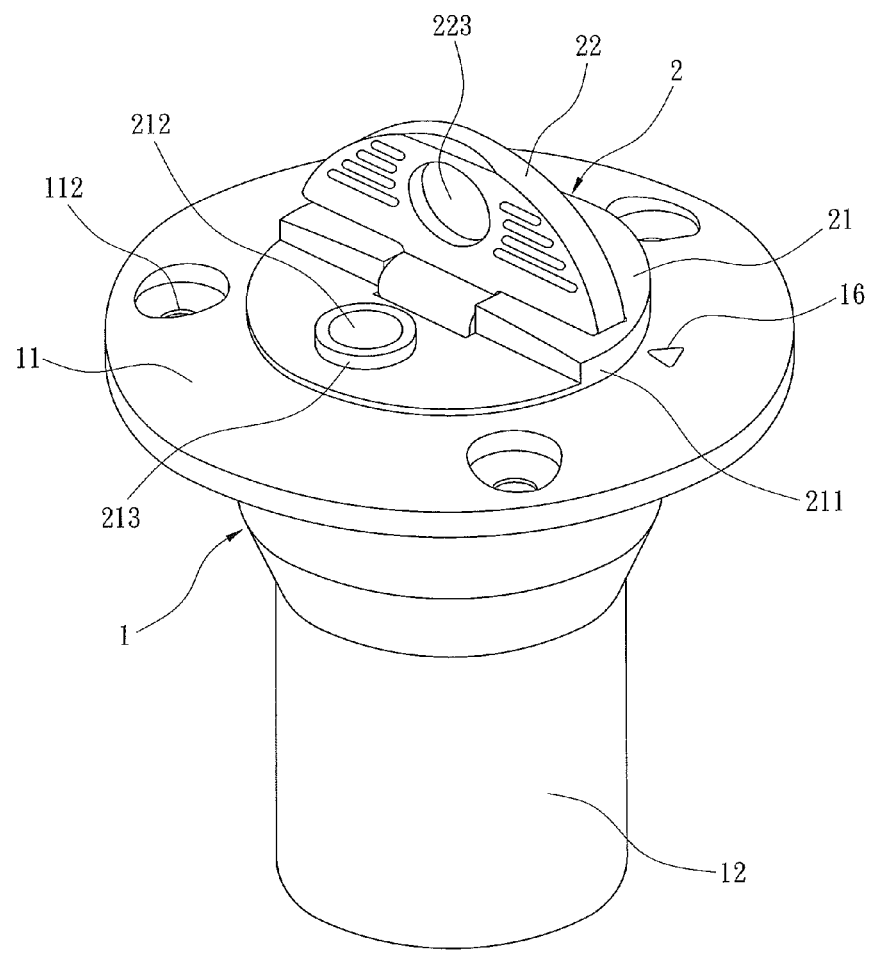
FIG. 2 is a perspective view similar to FIG. 1, with an operative portion of a fuel cap moved to an upright position.
Figure 3:
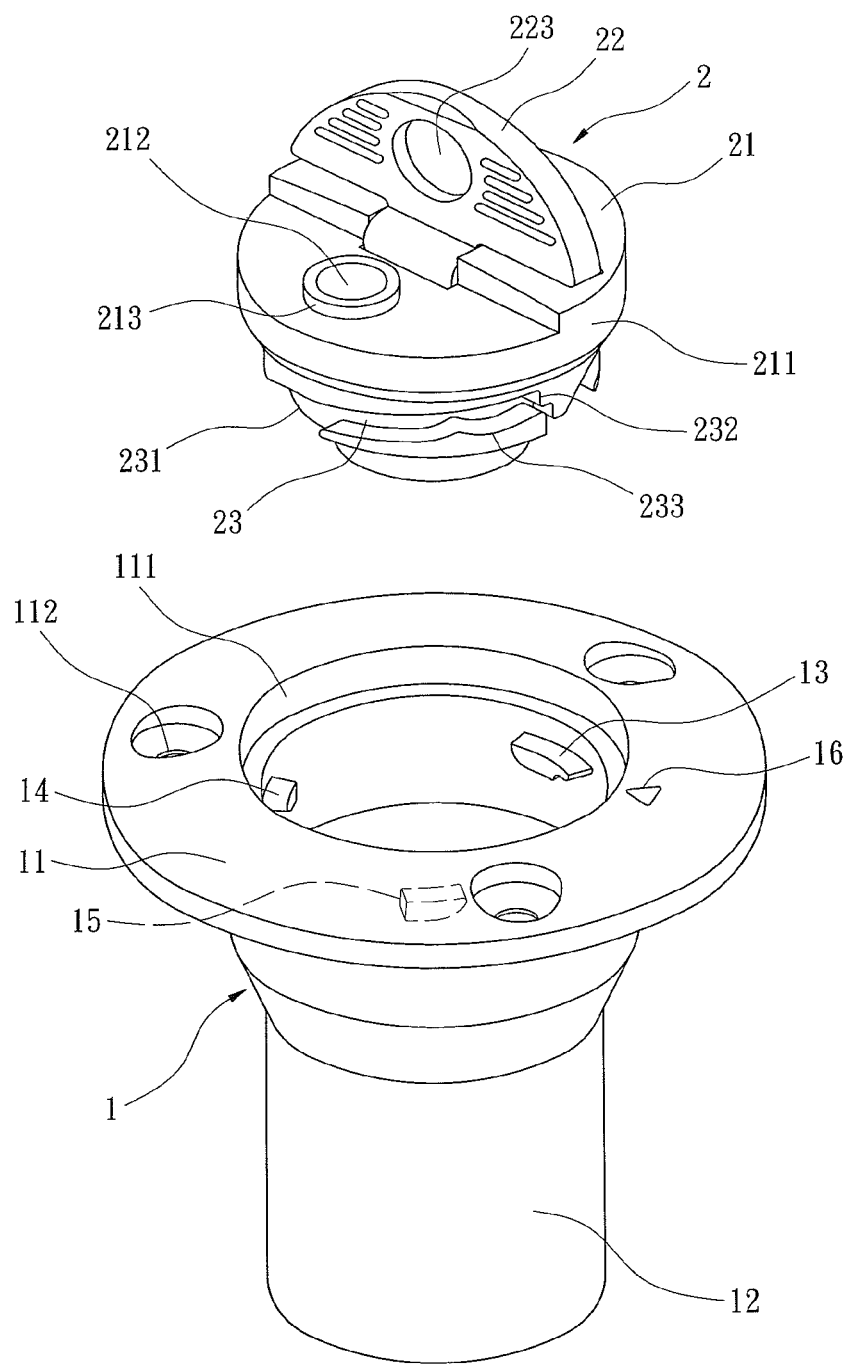
FIG. 3 is an exploded, perspective view of the fuel filling device of FIG. 2.
Figure 4:
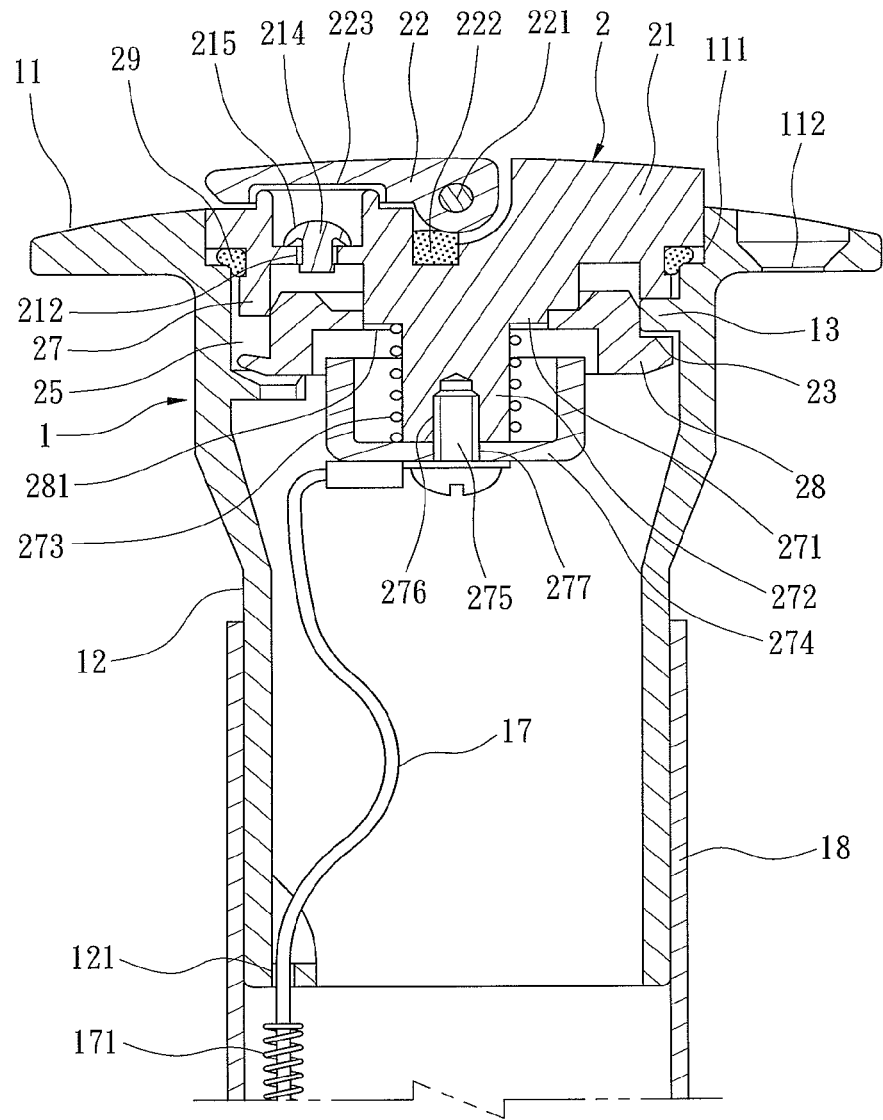
FIG. 4 is a longitudinal sectional view of the fuel filling device.
Figure 5:
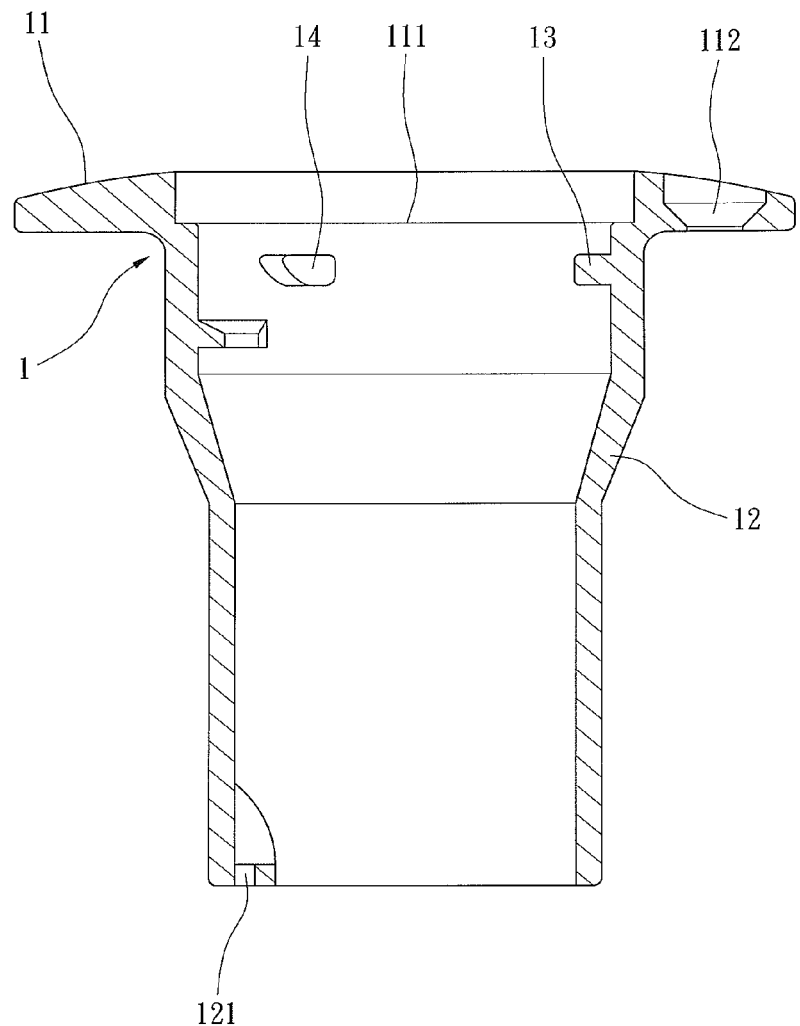
FIG. 5 is a longitudinal sectional view of a fuel pipe seat of the fuel filling device.
Figure 6:
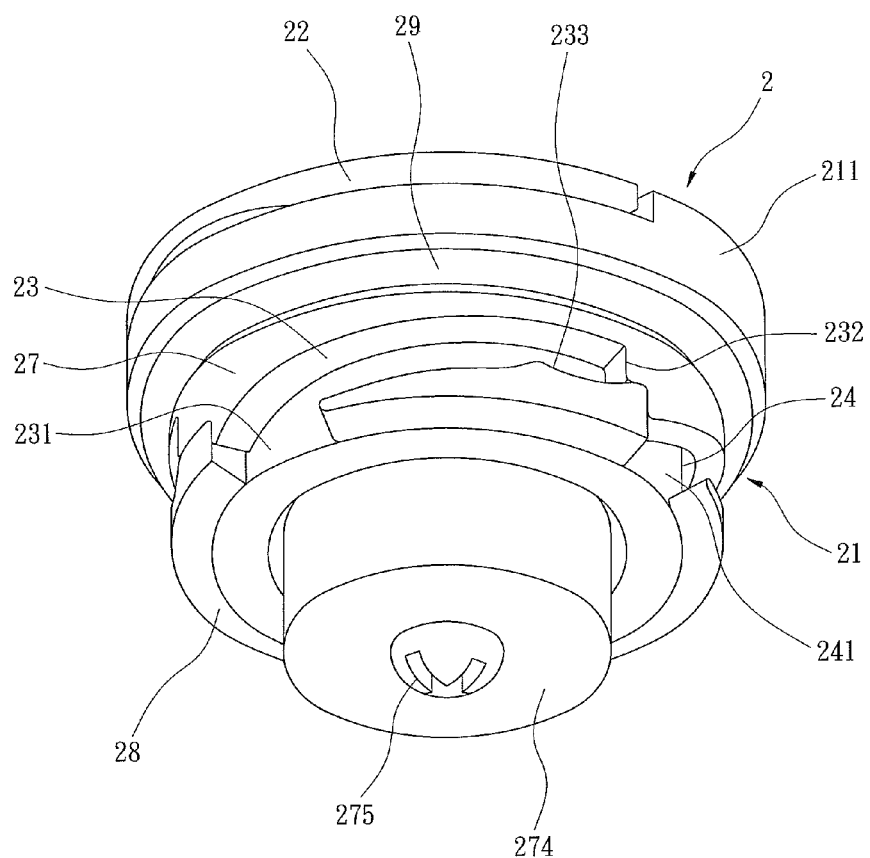
FIG. 6 is a bottom, perspective view of the fuel cap.
Figure 7:
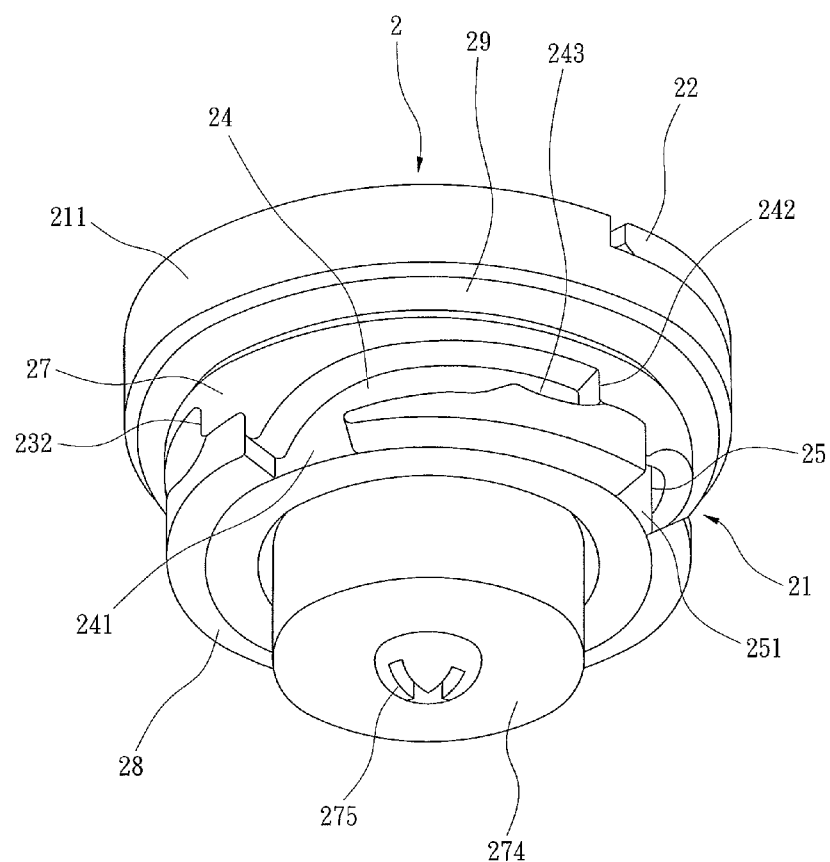
FIG. 7 is another bottom, perspective view of the fuel cap.
Figure 8:
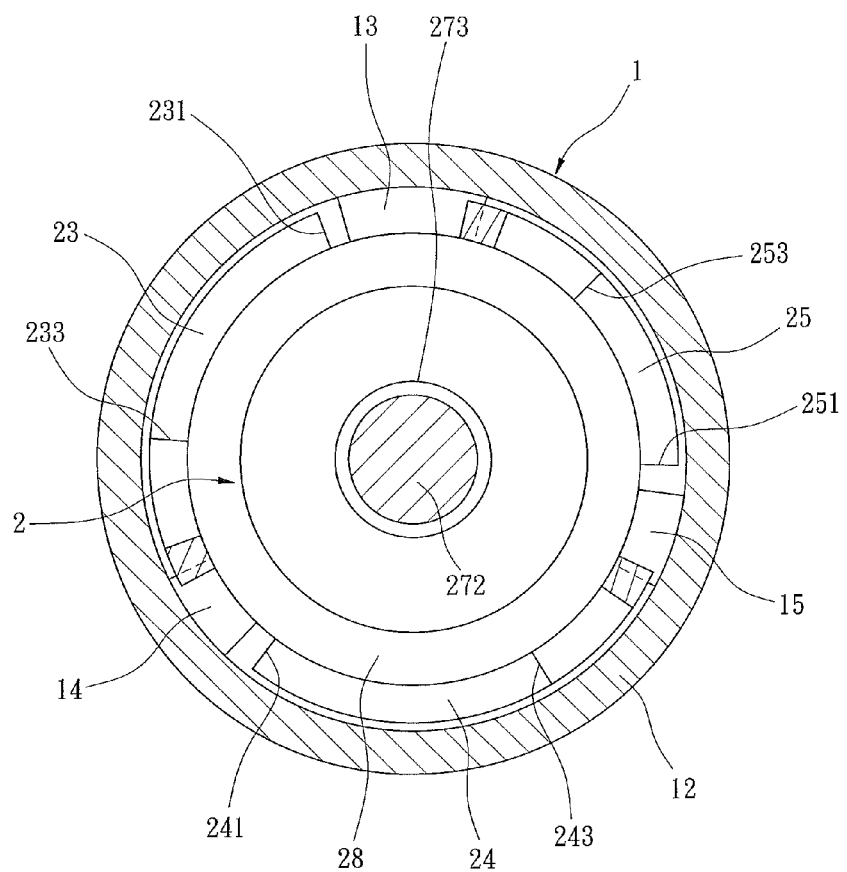
FIG. 8 is a cross sectional view of the fuel filling device.

With reference to FIGS. 1-4, a fuel filling device for a ship according to the present invention includes a fuel pipe seat 1 and a fuel cap 2 removably mounted to the fuel pipe seat 1. An oil pipe 18 (FIG. 4) is connected to a lower end of the fuel pipe seat 1 for communication with a fuel tank (not shown) of a ship.

With reference to FIGS. 1-8, the fuel pipe seat 1 includes a fixed seat 11 having a filling port 111 and a plurality of fixing holes 112. The fuel pipe seat 1 further includes a fuel pipe 12 extending downward from and in communication with the filling port 111. A first mark 16 is provided on the fixed seat 11. A first engagement portion 13, a second engagement portion 14, and a third engagement position 15 are formed on an inner peripheral face of the fuel pipe 12 and spaced from each other in a circumferential direction. The first engagement portion 13 has a length in the circumferential direction larger than a length of the second engagement portion 14 in the circumferential direction and larger than a length of the third engagement portion 15 in the circumferential direction.

The fuel cap 2 includes a body 21 extending along a longitudinal axis. An operative portion 22 is mounted to the body 21. A second mark 26 is provided on the body 21. A flange 211 extends outward from a top side of the body 21. A sealing ring 29 is mounted between the flange 211 and an outer periphery of the body 21. A first track 23, a second track 24, and a third track 25 are formed on an outer periphery of the body 21 and spaced from each other in a circumferential direction about the longitudinal axis. Each of the first, second, and third tracks 23, 24, and 25 includes a front, lower end and a rear, higher end having a stop 232, 242, 252. An entrance 231, 241, 251 is defined in front of the front, lower end of each of the first, second, and third tracks 23, 24, and 25. Lengths of the entrances 231, 241, and 251 of the first, second, and third tracks 23, 24, and 25 of the fuel cap 2 in the circumferential direction are equal to the lengths of the first, second, and third engagement portions 13, 14, and 15, respectively.

The body 21 of the fuel cap 2 further includes a bottom side spaced from the top side of the body 21 along the longitudinal axis of the body 21. A pressure relief hole 212 extends from the top side through the bottom side of the body 21 of the fuel cap 2. A pressure relief valve 212 is mounted in the pressure relief hole 212. The pressure relief hole 212 and the pressure relief valve 212 allow excessive pressure in the fuel pipe seat 1 to be released by moving an elastic valve head 215 of the pressure relief valve 212 upward.

An annular ridge 213 is formed on the top side of the body 21 and extends along a periphery of a top opening of the pressure relief hole 212. The operative portion 22 is pivotably mounted by a pin 221 to the top side of the body 21. The operative portion 22 is substantially a plate having a hole 223. The operative portion 22 is pivotable between a rest position and an upright position and can be retained in the rest position or the upright position by using an elastic pad 222. The annular ridge 213 is received in the hole 223 of the operative portion 22 when the operative portion 22 is in the rest position, preventing ambient fluid from entering the pressure relief hole 212. The operative portion 22 in the upright position can be gripped by an operator to rotate the body 21 for locking the fuel cap 2 to the fuel pipe seat 1 or removing the fuel cap 2 from the fuel pipe seat 1.

In the preferred form shown in FIGS. 3-8, the body 21 of the fuel cap 2 includes an upper body part 27 and a lower body part 28 engaged with the upper body part 27, with the upper and lower body parts 27 and 28 together defining the first, second, and third tracks 23, 24, and 25. The stops 232, 242, and 252 of the first, second, and third tracks 23, 24, and 25 are formed on the upper body part 27. The entrances 231, 241, and 251 of the first, second, and third tracks 23, 24, and 25 are formed on the lower body part 28. The lower body part 28 can be an elastomer. Each of the first, second, and third tracks 23, 24, and 25 includes a concave engagement section 233, 243, 253 adjacent to the stop 232, 242, 252. Each of the first, second, and third engagement portions 13, 14, and 15 has a bottom. The bottoms of the first, second, and third engagement portions 13, 14, and 15 are respectively engaged with the concave engagement sections 233, 243, and 253 when the fuel cap 2 is in the locking position.

Furthermore, the upper body part 27 includes a positioning portion 271 and a stub 272 extending downward from the positioning portion 271. The lower body part 28 includes an axial positioning hole 281. The positioning portion 271 of the upper body part 27 is received in the axial positioning hole 281 of the lower body part 28. A fixing member 274 is fixed to a bottom end of the stub 272 by extending a bolt 275 through a fixing hole 277 in the fixing member 274 into a screw hole 276 in the stub 272. A spring 273 is mounted around the stub 272 and between the positioning portion 271 and the fixing member 274. The spring 273 biases the lower body part 28 to press against the positioning portion 271 of the upper body part 27, with the upper and lower body parts 27 and 28 together forming the first, second, and third tracks 23, 24, and 25.

Figure 9:
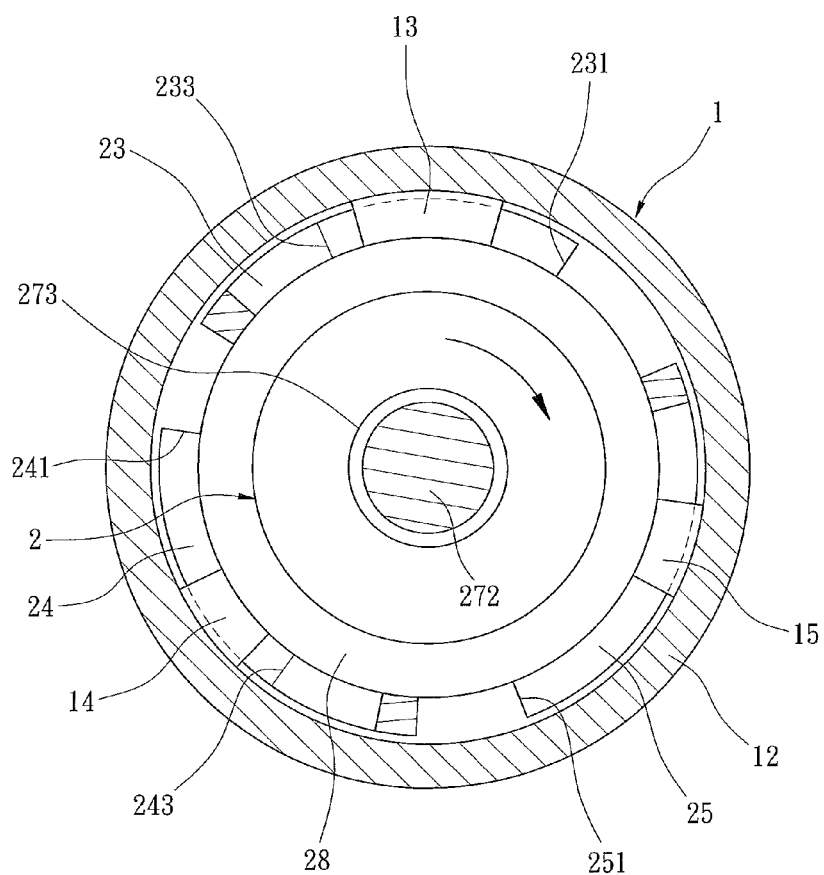
FIG. 9 is a view similar to FIG. 8, with the fuel cap rotated in a locking direction.
Figure 10:
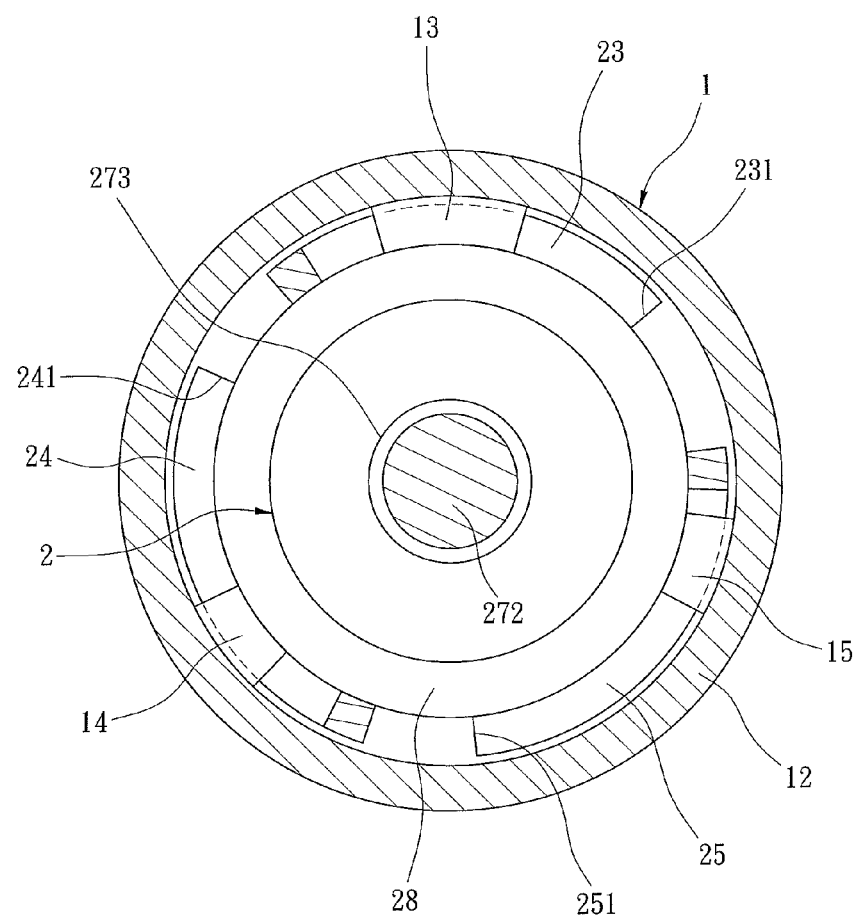
FIG. 10 is a view similar to FIG. 9, with the fuel cap further rotated in the locking direction to a locking position.

In locking operation of the fuel filling device, the fuel cap 2 is inserted downwardly into the fuel pipe 12 of the fuel pipe seat 1 with the first, second, and third engagement portions 13, 14, and 15 respectively received in the entrances 231, 241, and 251 of the first, second, and third tracks 23, 24, and 25, preventing misalignment. The fuel cap 2 is rotated relative to the fuel pipe seat 1 in a locking direction shown in FIG. 9. The first, second, and third tracks 23, 24, and 25 move relative to the first, second, and third engagement portions 13, 14, and 15 until the first, second, and third engagement portions 13, 14, and 15 are stopped by the stops 232, 242, 252 of the first, second, and third tracks 23, 24, and 25, and the fuel cap 2 is in a locking position and blocks the fuel pipe 12 (FIG. 10). Note that the concave engagement sections 233, 243, and 253 engage with the bottoms of the first, second, and third engagement portions 13, 14, and 15 after each of the first, second, and third engagement portions 13, 14, and 15 passes through a ridge in a corresponding one of the first, second, and third tracks 13, 14, 15 in front of the concave engagement section 233, 243, 253. A sound is generated when the fuel cap 2 reaches the locking position. The fuel cap 2 is moved downward relative to the fuel pipe seat 1 during the locking operation. The sealing ring 29 blocks the fuel pipe 12 when the fuel cap 2 is in the locking position. Furthermore, the second mark 26 is aligned with the first mark 16 when the fuel cap 2 is in the locking position, providing a visual indication for the operator while providing reliable sealing, leakproofness, and a dustproof function as well as allowing easy and fast operation of locking and opening of the fuel cap. The operator can easily remove the fuel cap 2 by rotating the fuel cap 2 in a reverse direction.

Although specific embodiments have been illustrated and described, numerous modifications and variations are still possible without departing from the essence of the invention. The scope of the invention is limited by the accompanying claims.

The invention claimed is:

1. A fuel filling device for a ship comprising:
a fuel pipe seat including a fixed seat having a filling port, with the fuel pipe seat further including a fuel pipe extending downward from and in communication with the filling port, with the fuel pipe including an inner peripheral face, and with a first engagement portion, a second engagement portion, and a third engagement position formed on the inner peripheral face of the fuel pipe and spaced from each other in a circumferential direction;
a fuel cap including a body extend along longitudinal axis with the fuel cap further including an operative portion mounted to the body, with the body including an outer periphery, with a first track, a second track, and a third track formed on the outer periphery of the body and spaced from each other in a circumferential direction about the longitudinal axis, with each of the first, second, and third tracks including a front, lower end and a rear, higher end having a stop, and with an entrance defined in front of the front, lower end of each of the first, second, and third tracks,
wherein the fuel cap is inserted into the fuel pipe of the fuel pipe seat with the first, second, and third engagement portions respectively received in the entrances of the first, second, and third tracks, the fuel cap is rotated relative to the fuel pipe seat in a locking direction, the first, second, and third tracks move relative to the first, second, and third engagement portions until the first, second, and third engagement portions are stopped by the stops of the first, second, and third tracks, and the fuel cap is in a locking position and blocks the fuel pipe,
with the body of the cap including a top side, with a flange extending outward from the top side of the body, with a sealing ring mounted between the flange and an outer periphery of the body, and
with the body of the fuel cap further including a bottom side spaced from the top side of the body along the longitudinal axis of the body, with a pressure relief hole extending from the top side through the bottom side of the body of the fuel cap, with a pressure relief valve mounted in the pressure relief hole, with an annular ridge formed on the top side of the body and extending along a periphery of a top opening of the pressure relief hole, with the operative portion pivotably mounted by a pin to the top side of the body, with the operative portion including a hole, with the operative portion pivotable between a rest position and an upright position, with the annular ridge received in the hole of the operative portion when the operative portion is in the rest position, and with the operative portion in the upright position adapted to be gripped by an operator to rotate the body for locking the fuel cap to the fuel pipe seat or removing the fuel cap from the fuel pipe seat.

2. The fuel filling device for a ship as claimed in claim 1, with the fixed seat including a first mark, with the body of the fuel cap including a second mark, and with the second mark aligned with the first mark when the fuel cap is in the locking position.

3. A fuel filling device for a ship comprising:
a fuel pipe seat including a fixed seat having a filling port, with the fuel pipe seat further including a fuel pipe extending downward from and in communication with the filling port, with the fuel pipe including an inner peripheral face, with a first engagement portion, a second engagement portion, and a third engagement position formed on the inner peripheral face of the fuel pipe and spaced from each other in a circumferential direction;
a fuel cap including a body extending along a longitudinal axis, with the fuel cap further including an operative portion mounted to the body, with the body including an outer periphery, with a first track, a second track, and a third track formed on the outer periphery of the body and spaced from each other in a circumferential direction about the longitudinal axis, with each of the first, second, and third tracks including a front, lower end and a rear, higher end having a stop, and with an entrance defined in front of the front, lower end of each of the first, second, and third tracks,
wherein the fuel cap is inserted into the fuel pipe of the fuel pipe seat with the first, second, and third engagement portions respectively received in the entrances of the first, second, and third tracks, the fuel cap is rotated relative to the fuel pipe seat in a locking direction, the first, second, and third tracks move relative to the first, second, and third engagement portions until the first, second, and third engagement portions are stopped by the stops of the first, second, and third tracks, and the fuel cap is in a locking position and blocks the fuel pipe,
with the first engagement portion of the fuel pipe seat having a length in the circumferential direction larger than a length of the second engagement portion in the circumferential direction and larger than a length of the third engagement portion in the circumferential direction, with lengths of the entrances of the first, second, and third tracks of the fuel cap in the circumferential direction respectively equal to the lengths of the first, second, and third engagement portions,
with the body of the fuel cap including an upper body part and a lower body part engaged with the upper body part, with the upper and tower body parts together defining the first, second, and third tracks,
with the upper body part including a positioning portion and a stub extending downward from the positioning portion, with the lower body part including an axial positioning hole, with the positioning portion of the upper body part received in the axial positioning hole of the lower body part, with a fixing member fixed to a bottom end of the stub, with a spring mounted around the stub, with the spring biasing the lower body part to press against the positioning portion of the upper body part, and with the lower body part being an elastomer, with each of the first, second, and third tracks including a concave engagement section adjacent to the stop thereof, with each of the first, second, and third engagement portions having a bottom, with the bottoms of the first, second, and third engagement portions respectively engaged with the concave engagement sections when the fuel cap is in the locking position, and with a sound being generated when the fuel cap reaches the locking position.

4. The fuel filling device for a ship as claimed in claim 3, with the stops of the first, second, and third tracks formed on the upper body part, and with the entrances of the first, second, and third tracks formed on the lower body part.

5. The fuel filling device for a ship as claimed in claim 3, with the bottom end of the stub having a screw hole, with the fixing member having a fixing hole, and with a bolt extending through the fixing hole of the fixing member into the screw hole of the stub to fix the fixing member.

6. A fuel cap for a ship comprising a body extending along a longitudinal axis, with the fuel cap further including an operative portion mounted to the body, with the body including an outer periphery, with a first track, a second track, and a third track formed on the outer periphery of the body and spaced from each other in a circumferential direction about the longitudinal axis, with each of the first, second, and third tracks including a front, lower end and a rear, higher end having a stop, with an entrance defined in front of the front, lower end of each of the first, second, and third tracks, with the entrance of the first track having a length in the circumferential direction larger than a length of the entrance of the second track in the circumferential direction and larger than a length of the third track in the circumferential direction, with the body of the fuel cap including an upper body part and a lower body part engaged with the upper body part, with the upper and lower body parts together defining the first, second, and third tracks, with the upper body part including a positioning portion and a stub extending downward from the positioning portion, with the lower body part including an axial positioning hole, with the positioning portion of the upper body part received in the axial positioning hole of the lower body part, with a fixing member fixed to a bottom end of the stub, with a spring mounted around the stub, with the spring biasing the lower body part to press against the positioning portion of the upper body part, and with each of the first, second, and third tracks including a concave engagement section adjacent to the stop thereof, with each of the first, second, and third engagement portions having a bottom, with the bottoms of the first, second, and third engagement portions respectively engaged with the concave engagement sections when the fuel cap is in the locking position, and with a sound being generated when the fuel cap reaches the locking position.

7. The fuel cap for a ship as claimed in claim 6, with the body of the fuel cap including a mark, and with the mark providing a reference for indicating the fuel cap is in the locking position.

8. The fuel cap for a ship as claimed in claim 6, with the body of the cap including a top side, with a flange extending outward from the top side of the body, and with a sealing ring mounted between the flange and an outer periphery of the body.

9. The fuel cap for a ship as claimed in claim 8, with the body of the fuel cap further including a bottom side spaced from the top side of the body along the longitudinal axis of the body, with a pressure relief hole extending from the top side through the bottom side of the body of the fuel cap, with a pressure relief valve mounted in the pressure relief hole, with an annular ridge formed on the top side of the body and extending along a periphery of a top opening of the pressure relief hole, with the operative portion pivotably mounted by a pin to the top side of the body, with the operative portion including a hole, with the operative portion pivotable between a rest position and an upright position, with the annular ridge received in the hole of the operative portion when the operative portion is in the rest position, and with the operative portion in the upright position adapted to be gripped by an operator to rotate the body for locking the fuel cap to the fuel pipe seat or removing the fuel cap from the fuel pipe seat.

10. The fuel cap for a ship as claimed in claim 6, with the stops of the first, second, and third tracks formed on the upper body part, and with the entrances of the first, second, and third tracks formed on the lower body part.

11. The fuel cap for a ship as claimed in claim 6, with the bottom end of the stub having a screw hole, with the fixing member having a fixing hole, and with a bolt extending through the fixing hole of the fixing member into the screw hole of the stub to fix the fixing member.

* * * * *